United States Patent [19]

Lotz et al.

[11] Patent Number: 5,468,336
[45] Date of Patent: Nov. 21, 1995

[54] FLEXURAL SPRING SUPPORT FOR VIBRATORY APPARATUS

[75] Inventors: Wilfried Lotz, Neuberg, Germany; Donald C. Lovett, Rochester, N.Y.

[73] Assignee: Branson Ultrasonics Corporation, Danbury, Conn.

[21] Appl. No.: 301,123

[22] Filed: Sep. 6, 1994

[51] Int. Cl.$^6$ .................................................... B29C 65/06
[52] U.S. Cl. ...................... 156/580.2; 156/73.5; 156/580
[58] Field of Search ............................. 156/73.1, 580.1, 156/580.2, 73.5, 580; 425/174.2; 264/23

[56] References Cited

U.S. PATENT DOCUMENTS

| | | | |
|---|---|---|---|
| 3,920,504 | 10/1974 | Smith | 156/580.2 |
| 4,349,931 | 9/1982 | Leon | 10/123 P |
| 4,853,053 | 8/1989 | Minjolle et al. | 156/73.5 |
| 5,160,393 | 11/1992 | Snyder | 156/73.5 |

OTHER PUBLICATIONS

Print File—Archival Preservers, Print File, Inc.—Copyright 1992.

Primary Examiner—David A. Simmons
Assistant Examiner—J. Sells
Attorney, Agent, or Firm—Polster, Lieder, Woodruff & Lucchesi

[57] ABSTRACT

A flexural spring support for a vibratory apparatus comprises a substantially stationary first member, a second member disposed opposite and spaced from said first member and intended to undergo translating motion in a plane, and a plurality of elongated flexural springs coupling said members to one another. Each spring is provided at its ends with a respective flange, the underside of which is in forced engagement with the surface of the associated member. Adjustable fastening means cause the engagement pressure to be of such magnitude as to prevent relative motion between the flange and member surface when said first member undergoes motion, thereby substantially eliminating fretting corrosion previously manifest at the springs. In addition, each spring is configured to form a clamped clamped constant strain tapered beam.

8 Claims, 1 Drawing Sheet

FLEXURAL SPRING SUPPORT FOR VIBRATORY APPARATUS

BRIEF SUMMARY

This invention generally relates to vibratory apparatus and is of particular use in connection with friction or vibration welding apparatus used for welding workpieces, particularly thermoplastic parts, to one another along a common interface surface responsive to generating frictional heat at such surface. More specifically, this invention concerns an improved flexural spring support for use in a vibration device, such as a welding apparatus, wherein a member, for instance a plate coupled to one of the parts to be welded, undergoes translating motion ill a plane for generating frictional heat at the common interface surface between the parts. The vibration may be a reciprocating translating motion, elliptical motion, orbital motion or a similar translating motion, all such motions occurring within a plane which can be identified as the motion plane.

Friction or vibration welding apparatus for the purpose stated above are well known in the art, see for instance, U.S. Pat. No. 3,920,504 issued to A. Shoh et al, dated Nov. 18, 1975, showing an electromagnetically actuated welding apparatus providing reciprocating translating motion, or U.S. Pat. No. 5,160,393 issued to E. A. Snyder, dated Nov. 3, 1992, showing a similar apparatus providing orbital motion.

In an apparatus of this type, a support is required which couples the member subjected to motion to a stationary frame and such a support generally includes a plurality of flexural springs which suspend the movable member, yet permit it to be displaced while retaining it in the motion plane during its motion. The construction and attachment of these springs presents unique problems in that either the springs are not configured for long life, or that the attachment of the springs is such that fretting corrosion and metal fatigue occur, causing a very short life of operation of the apparatus with the attendant interruption of production.

In order to overcome these problems, the present invention discloses a flexural spring support in which the spring attachment at either end of the spring is such that high and localized stress concentration is avoided, thereby largely eliminating the problem of fretting corrosion. To this end, each spring end is provided with a flared flange, the flat underside of which rests on a respective member surface to distribute flexural stress over a larger area. In addition, each spring is shaped to form a clamped clamped constant strain tapered beam, which term will be defined later, thereby eliminating breakage as the strain is selected to be below the maximum allowable design stress applicable to the particular material. These features enhance the performance and reliability of the springs and thereby that of the apparatus of which the flexural spring support forms a part.

A principal object of this invention, therefore, is the provision of a new and improved flexural spring support.

Another important object of this invention is the provision of a new and improved flexural spring support, particularly useful in connection with friction or vibration welding apparatus.

A further important object of this invention is the provision of a flexural spring support for a vibratory apparatus, overcoming the problems inherent in securing the ends of the flexural springs to other structural members.

Another and further object of this invention is the provision of a flexural spring support in which fretting corrosion of individual springs is minimized, if not substantially eliminated.

Still another and further object of this invention is the provision of a flexural spring support for a vibratory apparatus, comprising a substantially stationary member, a member to be driven in a motion plane, and a plurality of spaced flexure springs coupling the members to one another, each spring being shaped to form a constant strain tapered beam.

Further and still other objects of this invention will become more clearly apparent from the following description when taken in conjunction with the accompanying drawings.

DESCRIPTION OF THE INVENTION.

Figure 1:
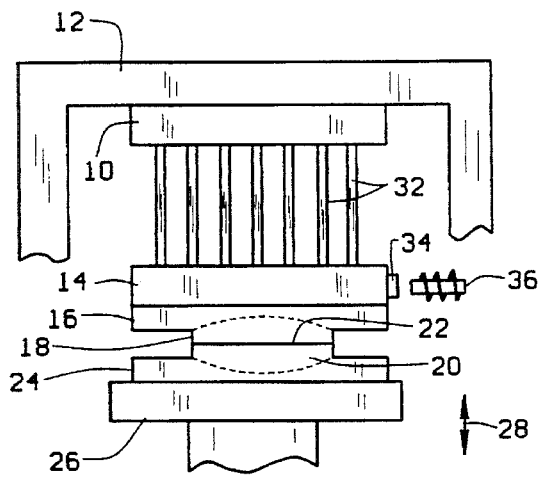
FIG. 1 is a schematic elevational view of a typical vibratory apparatus for friction welding.

Referring now to the figures and FIG. 1 in particular, numeral 10 designates a first metal member which is secured to a relatively massive frame structure 12. Disposed opposite and in spaced relation there is disposed a second metal member 14 which at its underside is provided with a fixture plate 16 for holding one part 18 of a workpiece to be welded to another part 20 of such workpiece along a common interface surface 22. The part 20 is held in a fixture plate 24 which is attached to a vertically movable table 26 as indicated by arrow 28 to provide an adjustable engagement force between the parts 18 and 20 for welding the parts to one another and also for providing an opening to enable the subsequent removal of the welded workpiece.

The second member 14 is suspended from the first member 10 by an array of spaced metal rods 32 which form flexural springs for enabling the member 14 to undergo translating motion in a plane, which is the motion plane, and which is parallel to the plane in which the interface surface 22 is disposed. When the member 14 is at rest, the axis of each of the springs is substantially perpendicular to the motion plane. Depending on the motive means acting upon the member 14, such as one or more pole pieces 34 and the corresponding placement of electromagnetic coils 36, the movable member 14 may undergo a translating reciprocating motion, an orbital motion, an elliptical motion, or similar motion in the motion plane. Such motion generates frictional heat at the interface surface 22 to cause, in the example of thermoplastic parts, plastic material to soften and to flow.

Securing the ends of each rod 32 to the respective members 10 and 14 presents unusual problems. In a typical prior art arrangement, see Snyder supra, each end of a spring is secured to the respective member 10 and 14 by a press fit. It will be realized that members 10 and 14, responsive to motion of member 14, undergo opposite motion in parallel planes. The excursion of the members is inversely related to their effective masses and, in a typical example, the masses are selected to cause member 10 to undergo a motion which is in the order of ten or fifteen per cent of that of the driven member 14. This smaller motion is readily isolated from the stationary frame by shock mounts, not shown, disposed in the frame structure. Typical motion occurs at a frequency in the range between 100 and 240 Hz. Using a press fit, the ends of the springs, during assembly, must be driven in unison into one member and then into the other member, requiring an enormous amount of pressure. In addition, referring to FIG. 2, the repetitive, high frequency flexing of each spring 32, indicated by dashed lines on a somewhat exaggerated scale, causes localized fretting corrosion of the springs in the region denoted by numeral 38. This fretting corrosion, manifest at the area of highest stress, is responsible for a rather short operating life of the apparatus with the attendant interruption of production.

Figure 3:
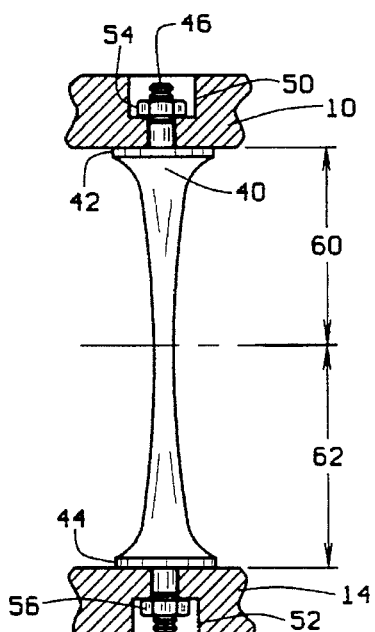
FIG. 3 is an elevational view, partly in section, showing the improved flexural spring construction and attachment.
Figure 4:
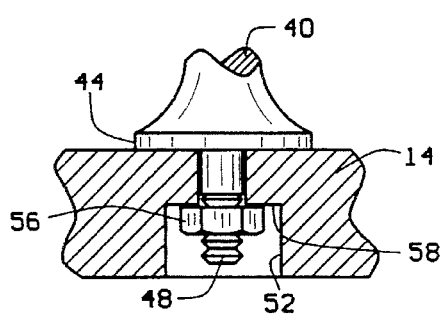
FIG. 4 is an enlarged view of the spring end and attachment.

An improved flexural spring construction and attachment thereof is shown in FIGS. 3 and 4. With reference to these figures, numeral 40 identifies one of the elongated, flexural springs coupling the members 10 and 14 to one another. The spring 40 is provided at both ends with a respective flared, cylindrical flange 42 and 44, the underside of each flange resting on the flat surface of a respective member 10, 14. A partially threaded stud 46, 48 extends from the underside of each flange and extends into a respective aperture 50, 52 of the respective member. A threaded nut 54, 56 engages the respective stud at the threaded portion and, upon being tightened against a respective ledge 58 of the aperture, see FIG. 4, provides the engagement force which causes the flat underside of each flange to be in forced engagement with the respective member. In practice, a torque wrench is used to produce a predetermined engagement pressure for inhibiting, for all practical purposes, relative sliding motion between the flanges and the members 10 and 14 responsive to motion of member 14. As will be noted, when tightening the nuts, the studs 46 and 48 will be subjected to tension. The apertures 50 and 52 are aligned to cause each spring 40, absent any motion being applied to member 14, to have an axis which is perpendicular to the motion plane of member 14.

Figure 2:
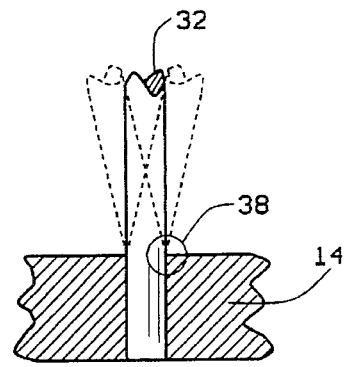
FIG. 2 is an elevational view, partly in section, illustrating the attachment of the flexural springs in the prior art.

An important aspect of the improved construction of the springs per FIGS. 3 and 4 concerns the fact that the localized, high stress area 38, see FIG. 2, at the entry of the spring into the aperture has been eliminated and the stress responsive to motion of moving member 14 is moved radially away from the aperture to the larger interface area between the flange and associated member. Due to the larger surface area, the stress is distributed, hence being of a lower magnitude per unit of surface. As a result, the occurrence of fretting corrosion is substantially eliminated and, if occurring, will be present in the low stress area underneath the flange. It has been found that good results are achieved when the underside of the flange is a ground surface and has a diameter of at least three times the diameter of the stud. Moreover, as contrasted with the prior art, the present embodiment renders each flexural spring individually replaceable.

If desired, a lock washer can be provided under each respective nut for assuring retention of the engagement force.

Another important improvement of the present invention concerns the shape and construction of each flexural spring 40. Each spring is of circular cross-section and forms a double tapered beam, i.e. tapered from the end or base toward the middle, see numerals 60, 62, and the beam is constructed as a substantially constant strain spring. For the purpose of this specification and claims, this beam construction is termed "clamped clamped substantially constant strain tapered beam". The dimensioning of the beam is derived most suitably by finite element analysis, known to those skilled in the art. When designing the spring, the expected operational stress is kept below the maximum allowable design stress for the material selected.

Figure 5:
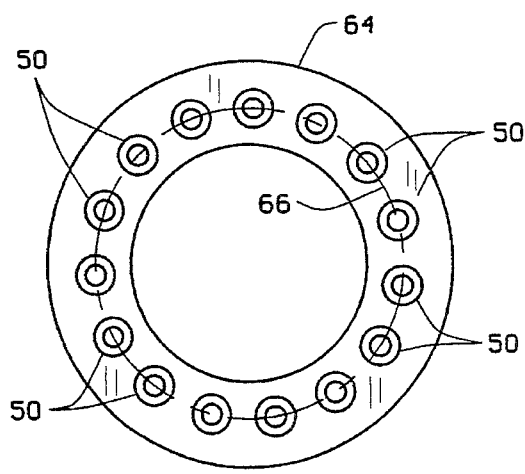
FIG. 5 is a plan view showing one typical embodiment of the flexural spring support.
Figure 6:
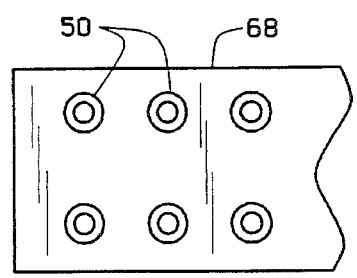
FIG. 6 is a plan view showing an alternative embodiment of the flexural spring support for a vibratory apparatus.

With reference to FIGS. 5 and 6, the flexural spring support for a vibratory apparatus may take several shapes. In FIG. 5, the upper substantially stationary member comprises an annular plate 64 and the apertures 50 and springs are disposed along a circle 66. In FIG. 6, the spring support is of rectangular or square shape so, that the member comprises a square or rectangular plate 68 with the apertures 50 and springs aligned along a plurality of sides. It will be apparent that other configurations also may be used.

It clearly will be evident that the improved flexural spring construction substantially overcomes the problem of localized fretting corrosion experienced heretofore in the region where a spring is secured to a respective plate member. In addition, the construction of each spring in the form of a clamped clamped substantially constant strain tapered beam must be considered as a significant feature in that reliability and service life are greatly improved.

While there has been described and illustrated a preferred embodiment of the present invention and certain alternative constructions have been indicated, it will be apparent to those skilled in the art that various further changes and modifications may be made without departing from the principle of this invention, which shall be limited only by the scope of the appended claims.

What is claimed is:

1. A flexural spring support for a vibratory apparatus comprising:

a first member adapted to be coupled to a stationary frame;

a second member disposed opposite and spaced from said first member and intended to undergo translating motion in a plane responsive to motive means acting upon said second member;

a plurality of elongated, spaced flexural springs coupling said first member to said second member;

each of said flexural springs including a flange at either end, the underside of each flange resting upon the surface of a respective one of said members;

fastening means disposed for causing the underside of each flange to be in forced engagement with the respective member surface, and said forced engagement being of such magnitude as to substantially inhibit relative motion between a respective flange and associated member surface responsive to translating motion of said second member.

2. A flexural spring support for a vibratory apparatus as set forth in claim 1, each, of said flanges being of substantially cylindrical shape with a flat underside for engaging a corresponding flat surface portion of a member; said fastening means comprising respective apertures in said first member and second member for receiving therein a threaded stud extending from the underside of each flange; a threaded nut engaging a respective threaded stud, and responsive to tightening such nut against a ledge in the aperture, the stud being put under tension for causing the underside of the corresponding flange to be in said forced engagement.

3. A flexural spring support for a vibratory apparatus as set forth in claim 2, each flange having a diameter at its underside at least three times the diameter of the aperture into which the stud extends.

4. A flexural spring support for a vibratory apparatus as set forth in claim 1, each of said flexural springs dimensioned to form a clamped clamped substantially constant strain tapered beam.

5. A flexural spring support for a vibratory apparatus as set forth in claim 4, said tapered beam being round.

6. A flexural spring support for a vibratory apparatus as set forth in claim 1, said first member being an annular plate and said springs being disposed along a circle.

7. A flexural spring support for a vibratory apparatus as set forth in claim 1, at least one of said members being of rectangular configuration., and said springs disposed along a plurality of sides.

8. A flexural spring support for a vibratory apparatus as set forth in claim 1, the surfaces of said members engaged by said flanges of said springs being disposed in planes which are parallel with the plane of motion of said second member, and in the absence of such motion, the axis of each spring being disposed normal to said plane of motion.

* * * * *